United States Patent Office 3,093,663
Patented June 11, 1963

3,093,663
DERIVATIVES OF 21-FLUORO-17α-METHYL-PREGNANES
Romano Deghenghi, Westmount, Quebec, Canada, assignor to American Home Products Corporation, New York, N.Y., a corporation of Delaware
No Drawing. Filed June 26, 1961, Ser. No. 119,292
3 Claims. (Cl. 260—397.3)

This invention relates to new orally active progestational agents. More particularly it relates to 1-dehydro-21-fluoro-17α-methylprogesterone and to 21-fluoro-17α-methylprogesterone, both of which are progestational agents of unusually high activity when administered orally. They exhibit unusually long duration of action, are unusually effective in maintenance of pregnancy, and are free of androgenic activity. 1-dehydro-21-fluoro-17α-methylprogesterone is unusual in that, in contrast to most oral progestational agents, it is more active when administered orally than when administered subcutaneously. It is readily apparent from the foregoing that these compounds are of great value in therapy and research in both human and veterinary medicine. They may be compounded with any of the common binders, carriers, diluents, excipients, etc., and formed into pills, tablets, capsules, etc., or may be administered as a solution or suspension in any of the conventional liquid media.

21-fluoro-17α-methylprogesterone may be prepared from 21-chloro-17α-methylprogesterone, the preparation of which is described in the second paragraph of Example 2 of U.S. Patent No. 2,601,168. When this material is heated with sodium iodide in acetone solution, for example, it is converted to 21-iodo-17α-methylprogesterone which may then be converted to 21-fluoro-17α-methylprogesterone by reaction with silver fluoride.

1-dehydro-21-fluoro-17α-methylprogesterone may be prepared by a partial and selective dehydrogenation of 21-fluoro-17α-methylprogesterone, prepared as described above.

A convenient method of effecting this partial and selective dehydrogenation is to heat 21-fluoro-17α-methylprogesterone in dioxane solution with slight molar excesses of 2,3-dicyano-5,6-dichlorobenzoquinone and p-toluene sulfonic acid.

The following examples will illustrate the practice of this invention.

Example 1

Two grams of 21-chloro-17α-methylprogesterone is dissolved in 15 ml. acetone and refluxed for thirty minutes with a solution of 2.0 g. sodium iodide in 10 ml. acetone. Sodium chloride separates during the reaction. The product representing crude 21-iodo-17α-methylprogesterone is extracted with methylene chloride, taken to dryness and redissolved in 175 ml. of acetonitrile. The acetonitrile solution is then boiled for 22 hours under a Soxhlet apparatus containing an excess of silver fluoride in the thimble. Under these conditions, silver fluoride is gradually extracted down into the steroid solution and reacts to form 21-fluoro-17α-methylprogesterone. After the 22 hours of heating, the acetonitrile is evaporated off and the crude product is extracted from the evaporation residue with methylene chloride. It may be chromatographed on Florisil, from which a mixture of benzene and ether elutes the title compound. Alternatively, it is practical to crystallize the product from a mixture of acetone and hexane.

Prisms (from acetone-hexane), M.P. 179–182 [α]$_D$ +95.3°.

Calcd. for $C_{22}H_{31}O_2F$: C, 76.26; H, 9.02; F, 5.48. Found: C, 76.38; H, 8.88; F, 5.38.

Example 2

346.5 milligrams of 21-fluoro-17α-methylprogesterone (1/1000 mole) was dissolved in 12 ml. dioxane and heated with 19 mg. p-toluenesulphonic acid and 250 mg. 2,3-dicyano-dichlorobenzoquinone for three and one-half hours on a steam bath.

After cooling, 250 mg. of 2,3-dicyano-5,6-dichlorobenzohydroquinone were recovered by filtration. The filtrate was extracted with ether, washed with $NaHCO_3$ solution and water, the ether dried and evaporated to give 338 mg. of a yellow oil which crystallized from acetone.

The substance, representing crude 1-dehydro-21-fluoro-17α-methylprogesterone was decolorized by filtration through silica gel and recrystallized from acetone-hexane to give needles, M.P. 162–164° C.

I claim:
1. A substance selected from the group consisting of 21-fluoro-17α-methylprogesterone and 1-dehydro-21-fluoro-17α-methylprogesterone.
2. 21-fluoro-17α-methylprogesterone.
3. 1-dehydro-21-fluoro-17α-methylprogesterone.

References Cited in the file of this patent
UNITED STATES PATENTS

| | | |
|---|---|---|
| 2,601,168 | Plattner et al. | June 7, 1952 |
| 2,837,464 | Nobile | June 3, 1958 |
| 2,894,008 | Sollman | July 7, 1959 |
| 2,953,581 | Jensen | Sept. 20, 1960 |

OTHER REFERENCES

Chem. and Eng. News, More Active Hormones Possible, vol. 32, No. 27, July 5, 1954, pp. 2687–2688.

Tannhauser et al.: J.A.C.S. 78, 2658–9 (1956).

B.D.H. Ltd. Derwent Belgian Report No. 55A, p. A7 (1959).

Kissman et al.: J.A.C.S. 82, 2312–17 (1960), p. 2314 depended upon.